United States Patent
Contryman et al.

(10) Patent No.: US 12,056,771 B1
(45) Date of Patent: Aug. 6, 2024

(54) SYSTEMS AND METHODS FOR DESCRIPTIVE MACHINE LEARNING BASED UNDERWRITING

(71) Applicant: Omniscience Corp., Palo Alto, CA (US)

(72) Inventors: Alexander Wesley Contryman, San Francisco, CA (US); Jacob Ryan van Gogh, Mountain View, CA (US); William Bertrand, San Francisco, CA (US); Manu Shukla, Sunnyvale, CA (US)

(73) Assignee: OMNISCIENCE CORP., Palo Alto, CA (US)

( * ) Notice: Subject to any disclaimer, the term of this patent is extended or adjusted under 35 U.S.C. 154(b) by 0 days.

(21) Appl. No.: 16/557,804

(22) Filed: Aug. 30, 2019

(51) Int. Cl.
  *G06Q 40/08* (2012.01)
  *G06V 30/412* (2022.01)

(52) U.S. Cl.
  CPC .......... *G06Q 40/08* (2013.01); *G06V 30/412* (2022.01)

(58) Field of Classification Search
  None
  See application file for complete search history.

(56) References Cited

U.S. PATENT DOCUMENTS

| | | | |
|---|---|---|---|
| 2003/0167191 A1* | 9/2003 | Slabonik | G06Q 10/10 705/4 |
| 2003/0187778 A1* | 10/2003 | Sgaraglio | G06Q 40/08 705/38 |
| 2005/0055249 A1* | 3/2005 | Helitzer | G06Q 40/08 705/4 |
| 2018/0373711 A1* | 12/2018 | Ghatage | G06K 9/00449 |

* cited by examiner

Primary Examiner — Scott S Trotter
Assistant Examiner — Amit Patel
(74) Attorney, Agent, or Firm — Womble Bond Dickinson (US) LLP

(57) ABSTRACT

A method and apparatus for performing automated underwriting based on document images are described. The method may include receiving a document image corresponding to a form and data contained within the form for which an underwriting decision is to be rendered. The method may also include performing a first machine learning based analysis of the document image by extracting one or more keys and one or more values corresponding to the keys from the document image using a first machine learning model trained to digitize the form from the document image. The method may also include performing a second machine learning based analysis using the one or more keys and one or more values corresponding to keys as an input into a second machine learning model trained to make the decision based on key, value pairs. Furthermore, the method may include transmitting, to an organization system, a user interface generated using the decision and a confidence of the decision determined from the second machine learning based analysis.

21 Claims, 9 Drawing Sheets

Splits 1 .. N in Tree Based ML Model

Training Explainability Graph Based on Splits 1 .. N

Splits 1 .. N in Tree Based ML Model

Training Explainability Graph Based on Splits 1 ... N

SYSTEMS AND METHODS FOR DESCRIPTIVE MACHINE LEARNING BASED UNDERWRITING

BACKGROUND

Organizations, such as medical organizations, insurance organizations, financial institutions, and other organizations provide services to customers, such as insurance, loans, and other services. Prior to providing a customer with an insurance policy, funded loan, or other service, a customer will typically apply for the service by completing an application form containing relevant customer information that the organization designates before deciding whether to approve or reject the customer. For example, an organization that provides medical insurance may want to know medically relevant customer information, such as a potential customer's age, weight, smoking habits, drinking habits, blood pressure, prior significant diagnosis, etc. As another example, a consumer loan organization may want to know financially relevant information, such as annual salary, outstanding monthly debt, length of employment, credit score, etc.

Customer information is collected by organizations on application forms, such as paper forms, interactive forms rendered within an application (e.g., on the customer's mobile device or mobile device of an agent of an organization), an editable form displayed using a web page (e.g., on a computer system of the customer), etc. The customer information, as discussed above, includes a set of data points relevant to the service the customer is applying for, and which enables an organizational representative (e.g., an underwriter), to decide whether to accept or reject the customer based on the information provided in the application form. For example, certain data, combination of data, lack of data, etc. may represent a risk beyond that which the organization is willing to accept by extending the service to the potential customer. Conversely, other data, a different combination of data, providing certain data, etc. may represent an acceptable or low risk that the organization is willing to accept and therefore will accept or approve the potential customer's application.

This process of collecting potential customer information in an application form, reviewing the information, and then rendering a decision is not without its shortcomings. The process may be time consuming for an underwriter to complete leading to unacceptable customer wait times. Furthermore, two different underwriters each presented with the same data for a potential customer may reach different decisions, which can be considered as arbitrary or even discriminatory. One approach to solving the above problems is to provide for rule-based underwriting, where an engineer or other organizational representative defines complex rules and the conditions associated with those rules (e.g., If hospitalized in last 2 years for more than 2 days for cancer treatment, the application should be rejected). Such rule-based underwriting fails to capture situations not explicitly pre-defined by one or more rules (e.g., If hospitalized in last 2 years for more than 2 days for diabetes treatment would not be analyzable under the prior example rule). Rule-based approaches are therefore complex to define, and often fail to sufficiently cover each variation potentially encountered by an applicant or which an organization considers relevant. Therefore, rule-base approaches typically enact overly simplified rules, leaving a large number of cases still in the hands of human underwriters. Therefore, such rule-based approaches rely heavily on human intervention, which is the result that rule-based systems seek to avoid in the first instance.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
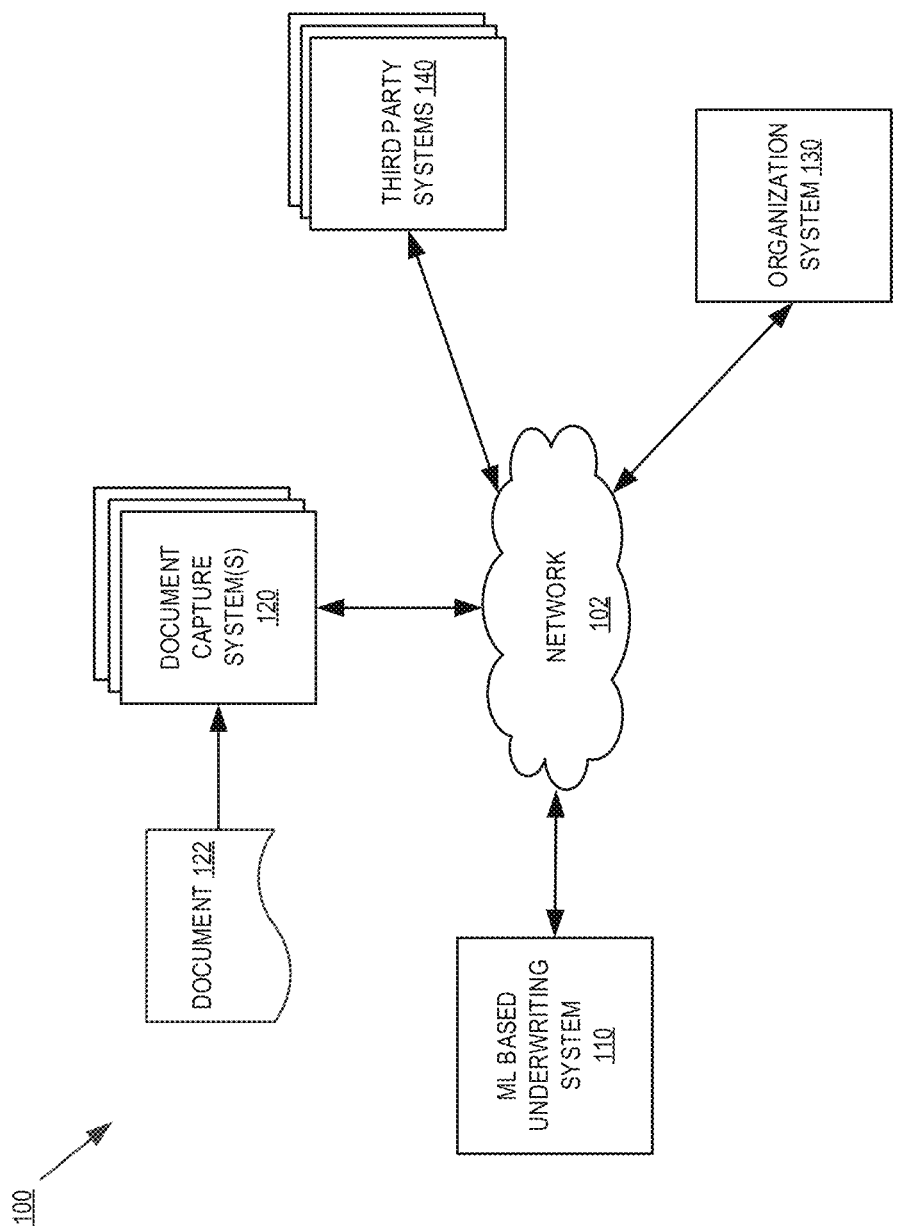
FIG. 1 is a block diagram of an exemplary system architecture for performing automated underwriting based on document images by a machine learning based underwriting system.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "performing", "transmitting", "transforming", "providing", "generating", "determining", "detecting", "storing", "tracking", "modeling", "including", "mapping", "using", "substituting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1 is a block diagram of an exemplary system architecture 100 for performing automated underwriting based on document images by a machine learning based underwriting system.

In one embodiment, the system 100 includes one or more computer systems for obtaining form images for an organization, such as document capture system(s) 120, an organization system 130, one or more third party systems 140 (e.g., social media platforms, fitness tracking platforms, user blogging systems, third party data aggregators, etc.) that may provide or have information relevant to a form, and machine learning (ML) based underwriting system 110. In one embodiment, document capture system(s) 120 may be a mobile computing device, such as a smartphone, tablet computer, wearable computing device, etc., as well as other devices capable of capturing image of forms, such as copiers, multi-function peripheral devices, laptop computers, kiosk computing devices, etc. The ML based underwriting system 110, organization system 130, and third party systems 140 may also be computing devices, such as one or more server computer systems, desktop computer systems, etc.

The document capture system(s) 120, organization system 130, ML based underwriting system 110, and third party systems 140 may be coupled to a network 102 and communicate with one another using any of the standard protocols for the exchange of information. In one embodiment, one or more of the document capture system(s) 120, organization system 130, ML based underwriting system 110, and third party systems 140 may run on one Local Area Network (LAN) and may be incorporated into the same physical or logical system, or different physical or logical systems. Alternatively, document capture system(s) 120, organization system 130, ML based underwriting system 110, and third party systems 140 may reside on different LANs, wide area networks, cellular telephone networks, etc. that may be coupled together via the Internet but separated by firewalls, routers, and/or other network devices.

In one embodiment, ML based underwriting system 110 may reside on a single server computer system, or be distributed among different servers, coupled to other devices via a public network (e.g., the Internet) or a private network (e.g., LAN). In embodiments, ML based underwriting system 110 may provide automated machine-learning based form digitization and underwriting decision making, as discussed herein, for a number of different contexts. As discussed herein, a context may include a service area of an organization (e.g., medical, insurance, loan, indemnity, etc.), as well as contexts specific to certain organizations (e.g., Organization A providing mortgage insurance uses a different set of data than Organization B also providing mortgage insurance, when deciding whether to accept or decline a mortgage insurance application of a potential customer). The present methods and systems for machine learning based automated underwriting are not limited to any specific context or organization, and are extensible to new contexts including languages, geographies, regulatory, etc.

In embodiments, a single ML based underwriting system 110 (e.g. a server or collection of communicably coupled servers) may be configured, for example by selection and use of different trained ML models, to provide automated underwriting decisions for a plurality of contexts and/or organization systems. In other embodiments, different instances of ML based underwriting systems 110 may each be configured to run a different trained ML model, and distributed as ML based underwriting system instances to different server systems, cloud service provides, distributed geographically (e.g., to increase network communication efficiencies, satisfy regulatory requirements, etc.), to provide load balancing, as well as distribution for other purposes. Furthermore, different processes of the ML based underwriting system 110 may be executed on different systems, for example and as discussed in greater detail below, when performing document image digitization and ML based underwriting decision, may be performed on the same computer processing system, or may be dynamically distributed as instances for one or more of the reasons discussed herein. It should be noted that various other network configurations can be used including, for example, hosted configurations, distributed configurations, centralized configurations, etc., or a combination of such configurations.

In embodiments, ML based underwriting system 110 is responsible for digitizing forms from document images, making underwriting decisions based on the digitized forms, and providing descriptive decision results to organization systems for which the decision was made. As discussed herein, a form image captures an application including a plurality of data entered onto or into the form by a potential customer of the organization system. For example, on a medical insurance application form, the potential customer may provide a number of different items of information, such as their name, social security number, birth date, sex, weight, height, pre-existing medical condition(s), family medical history, hospitalizations, lifestyle factors, as well as any number of other data that an organization may be interested in knowing when analyzing an application for medical insurance.

Prior to digitization and analysis of an application form, in embodiments, a document capture system 120 is responsible for capturing a document image of a form (e.g., a single form image, a plurality of page images, etc.). The form, as discussed herein, is an application for a service offered by the organization associated with organization system 130. In the example used for discussion purposes herein, the form is a medical insurance form, and the information/data on the form is provided by a potential customer of the organization that has completed the form (e.g., by handwriting on the form, electronically filling out the form, etc.). In embodiments, the document image(s) may be a photograph of the form, a scan, a document image generated by a computer processing application (e.g., generation of a GIF, TIFF, etc. from an electronic form), a PDF, as well as other types of document images. In embodiments, the form may be electronic (e.g., a web or application based form), where a document image of the form, as well as data entered into the form is packaged with the form image. Document capture system 120 then transmits the form image(s) via network 102 to ML based underwriting system 110. In embodiment, the communication may be performed using secure communications protocols (e.g., HTTPS, TLS, etc.) and/or using encryption of document images to safeguard sensitive customer information.

In embodiments, ML based underwriting system 110 receives document images, and decrypts the document images as necessary, before performing a digitization process on the document images. In embodiments, the document images may be structured, or unstructured forms, subject to skew, have poor quality/resolution, different lighting conditions, clarity conditions, in different languages, be handwritten, etc. Therefore, in one embodiment, ML based underwriting system 110 performs digitization of a form captured in document images using a sequence of ML based image analysis processes that, for example, perform ML based rotation prediction, ML based text segmentation, ML based value extraction, and builds a package of keys and values extracted from the document image(s). The sequence of ML based image analysis processes are responsible for using a document image as input (e.g., that received from document capture system 120), and extracting key, value pairs from the document image. Each key for a context of a form is a data field typically found in forms for the context.

For example, a form in the medical context may have the keys name, age, weight, heart rate, prior conditions, etc. As another example, a form having a loan application context may have the keys name, age, occupation, years employed, credit score, etc. From these two examples, different contexts may be associated with different keys, such that the keys are relevant to the particular context of a form.

In one embodiment, in response to receiving or otherwise accessing the document image 122, ML based underwriting system 110 utilizes the context of the form depicted within the image of document 122 to select and utilize the series of trained machine learning image analysis operations to predict and correct document rotation, perform text segmentation, perform text recognition, and then extract values associated with keys for the context associated with the image. Furthermore, each operation in the pipeline may include using one or more trained machine learning analysis techniques, and may utilize different trained machine learning analysis systems (e.g., neural networks, regression, support vector machines, decision trees, etc.) selected based on the task being performed. For example, prediction and correction of document rotation may utilize a first type of machine learning analysis suited to determining when a document is skewed, by how much, and how to correct the document's rotation, while extracting values and associating the values with keys utilizes a second type of machine learning analysis suited to associating recognized text with keys when creating key value pairs for a form.

In embodiments, the different types of machine learning analysis may include differently trained machine learning analysis systems (e.g., systems trained using different sets of training data), different machine learning architectures (e.g., a regression, random forests, neural networks, support vector machines, etc.) used by the machine learning analysis systems of different stages, or a combination. Embodiments of the ML based image analysis processes and techniques used by ML based underwriting system 110 for digitizing a form captured in one or more document image(s) are described in greater detail in U.S. patent application Ser. No. 16/167,334, filed on Oct. 22, 2018, titled "Systems and Methods for Machine Learning Based Content Extraction from Document Images," which is incorporated by reference herein in its entirety.

In embodiments, each of these operations collectively form a document processing pipeline that performs a first machine learning based analysis of a document image for a given context, and extracts keys and associated values from the document image to form a set of key, value pairs.

In some embodiments, in order to supplement extracted key, value pairs with additional key, value pairs, or to obtain missing values for a subset of keys (e.g., keys predefined as particularly relevant to a form), ML based underwriting system 110 may interact with one or more third party system(s) 140 to obtain the values. For example, third party system(s) 140 may analyze data available on their systems (e.g., photographic data, blog postings, social media postings, etc.) to extract data relevant to the subset of keys. As another example, ML based underwriting system 110 may analyze publicly available information (e.g., by crawling photographic data, blog postings, social media postings, etc.) and applying keyword searches, classifiers, etc. to locate/extract data relevant to the subset of keys.

After the key, value pairs are generated, and optionally supplemented, by the first machine learning based analysis, ML based underwriting system 110 utilizes the set of key, value pairs as an input to a second machine learning based analysis performed by the ML based underwriting system 110. As discussed in greater detail below, the second machine learning based analysis utilizes the set of key, value pairs extracted from the document image as an input for making an underwriting decision on the form. The decision may be to accept, reject, accept with conditions, reject without further information, as well as other decisions that may be made on a form for a given context (e.g., specific to a domain, service, and/or organization). In embodiments, a tree-based machine learning analysis is performed (e.g., tree based models, such as, but not limited to, CART, C4.5, C5, random forest, Gradient Boosted Trees, Adaptive Boosted Trees, XG Boosted Trees, Light GBM boosting, or other tree based ML techniques). As will be discussed in greater detail herein, tree based approaches are utilized to provide a confidence of a decision generated by the second machine learning based analysis, as well as a feature importance listing, feature importance scores, and/or a verbose explanation of a decision. In embodiments, the decision confidence, verbose explanation, and feature importance with optional feature scoring, provides both explainability to an adjuster reviewing a decision for a context of a form as well as for a specific decision, as well as to potentially satisfaction of compliance or regulatory requirements (e.g., showing how and why a decision was made given a certain set of data).

The decision, original document image(s), a form identifier, the explainability of the decision, etc. are then transmitted by ML based underwriting system 110 to organization system 130 via network 102. As discussed above, the transmission and/or data within the transmission may utilize secure techniques for the exchange of information, such as HTTPS, TLS, or other protocols, as well as data encryption, to protect sensitive customer information and decisions on the form. In embodiments, an email, web page, application data, etc. is transmitted to organization system 130 including one or more user interfaces, or data/instructions for populating a user interface, to provide the decision, results, and/or explainability to the organization system 130.

Prior to making decisions on forms/applications using document images, in embodiments, each of the first and second machine learning based analysis processes are trained for a given context (e.g., medical insurance, loan application, etc. and/or for a given organization). Therefore, in embodiments, organization system 130, one or more of third party system(s) 140, or another system, provides ML based underwriting system 110 with sets of training data. In embodiments, the training data may include a collection of document images (e.g., tens, to hundreds, to millions of document images), decisions associated with those document images (e.g., decisions made by human underwriters on a given set of data in a form), etc. That is, for example, a document image 1 may be associated with an accept decision, document image 2 may be associated with a reject decision, document image 3 may be associated with a conditional accept decision, and so on. In embodiments, the training data may include or may alternatively be key, value pairs associated with forms and their corresponding decisions.

In embodiments, ML based underwriting system 110 receives the corpus of training data (e.g., document images and decisions, key, value pairs and decisions, or a combination), and then applies the first machine learning based analysis to extract key, value pairs from document images, as necessary. In embodiments, it is assumed that the first machine learning based analysis is trained prior to receiving the corpus of training data, as discussed in U.S. patent application Ser. No. 16/167,334, filed on Oct. 22, 2018, titled "Systems and Methods for Machine Learning Based Content Extraction from Document Images," which is incorporated by reference herein in its entirety.

ML based underwriting system 110 therefore utilizes the output of the first machine learning based analysis to generate a set of training data for training the second machine learning based analysis (e.g., the tree based machine learning model for making decisions on individual applications). In one embodiment, ML based underwriting system 110 collects the sets of key, value pairs and associated decisions into the set of training data. For example, a text file, matrix, or other data structure can be generated that encapsulates and/or transforms the keys and corresponding values with associated decisions into a form suitable for analysis by an ML tree based training technique. Then, this data structure is fed into a training process for the second machine learning based analysis technique, such as training that occurs when training a tree based model such as a decision tree including but not limited to, for example, CART, C4.5, C5, random forest, Gradient Boosted Trees, Adaptive Boosted Trees, XG Boosted Trees, Light GBM boosting, etc. The result is a model capable of analyzing key, value pairs when making a decision for a given form. Each split in the tree based model training is captured in a training explainability graph consists of nodes and edges that capture how the variable values are split until it reaches the decision in the leaf node in tree based model.

As discussed herein, the tree based model is a collection of a plurality models that utilize a key at each node to make a decision based on the value of the key for a given form. The flow of decisions in each tree ultimately terminates in a decision. Then, tree based model "scores" the observation and generates a decision with an associated confidence value (e.g., which is generated by the tree based technique being deployed). Furthermore, when the flow of decisions are tracked through tree based models as splits in the variables, as discussed below, additional information including a verbose explanation of the ultimate decision (e.g., data indicating how each decision flowed thought each split in the tree based model), and a decision explanation graph (e.g., a graph encapsulating how a decision was ultimately reached within the tree based model) can be generated for determining feature importance (e.g., what specific features, such as relative importance of specific keys and associated values in the ultimate decision).

In embodiments, as discussed above, the training of the first and second machine learning based processes (e.g., for form digitization and then decision making based on extracted key, value pairs), make decisions with associated confidences. In embodiments, when an ML based determination generated by ML based underwriting system 110 is below a threshold confidence (e.g., a value extracted for a key is associated with a confidence level below a first threshold, or a decision based on key, value pairs is associated with a confidence level below a second threshold), ML based underwriting system 110 generates an interface for human intervention. That is, for example, the interface could seek a user of document capture system 120, organization system 130, or other users to correct and/or fill in a value in a form that does not satisfy a threshold level of confidence (e.g., for key age, it is unclear on a handwritten from whether an applicant is 55 or 85). As another example, the interface could seek an underwriter decision when a decision confidence level does not satisfy a threshold level of confident (e.g., an accept decision on a form is only associated with a 60% confidence).

In embodiments, the intervention and answers of the user are then provided back to ML based underwriting system 110. In embodiments, the corrected and/or completed values, as well as key, value pairs with corrected and/or updated decisions, are used by ML based underwriting system 110 to generate sets of retraining data. That is, ML based underwriting system 110 periodically retrains itself with the user supplied answers to low confidence decisions. In embodiments, the sets of training data may trigger retraining of the first and/or second machine learning based analysis processes periodically when, for example, a certain time duration has passed, a certain number of retraining data has been collected, etc. In embodiments, by retraining periodically, trends in underwriting decision making can be captured and reflected in the ML based processes used by ML based underwriting system 110. Furthermore, accuracy and/or the ability to handle different data sets is continually improved by the ML based underwriting system 110.

In embodiments, the techniques utilizing the first and second machine learning based processes by ML based underwriting system 110 provide a predictable and much less variable response to forms. Being agnostic to the format of the form or where on the form a particular key value is located, by using the ML based form digitization techniques discussed herein, makes digitization much more accurate across different forms, inputs, contexts compared to other systems. The digitization and subsequent scoring of the forms is also much faster than a human transcribing the information from images and then using the information to score new application much more efficiently than a human underwriter. Furthermore, the ML based techniques discussed herein are extremely efficient over prior techniques. Furthermore, the techniques including form digitization and decision making based on the digitization increase the efficiency of form-based decision making by providing relatively instantaneous decisions on forms for a given context, as well as the ability to expand decision making beyond that provided by rule-based models (e.g., handling decisions on forms given a combination of data not defined by a specific rule). Thus, a decision may also be communicated back to document capture system 120 to, for example, enable a field agent of the organization to give instant form/application results, ensure regulatory compliance, etc. Additionally, by not relying on rules-based techniques that utilize known queries, ML based underwriting system 110 need not make hard coded assumptions about the layout and structure of document images, and/or about how to make underwriting decision based on key, value pairs. Furthermore, the machine learning techniques discussed herein are adaptable to new form types, new document layouts, new languages, new document qualities, trends in decision making, geographic differences in decision making, etc., which enables ML based underwriting system 110 to be used for any number of forms and contexts.

Figure 2:
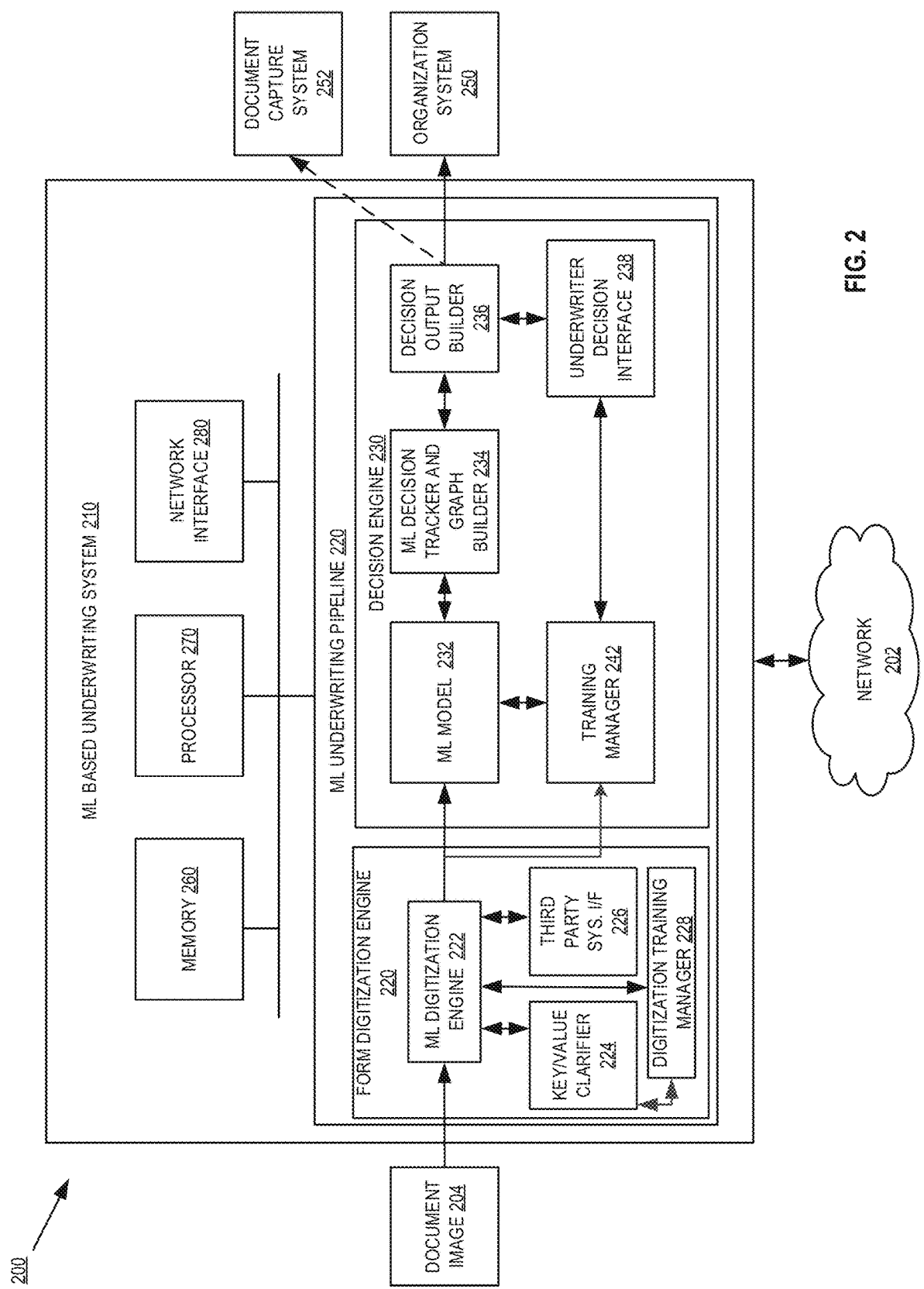
FIG. 2 is a block diagram of one embodiment of the machine learning based underwriting system.

FIG. 2 is a block diagram of one embodiment 200 of a ML based underwriting system 210. ML based underwriting system 210 provides additional details for the ML based underwriting system 110 discussed above in FIG. 1. As shown in FIG. 2, ML based underwriting system 210 receives an image of a document (e.g., an image of an application form) and generates decision for a given context associated with the document image (e.g., a decision to accept, reject, etc. the application for an organization in a given domain). As discussed herein, the decision may also include the received document image, explainability data, one or more identifiers (e.g., identifiers of an applicant associated with the form), as well as other information relevant to an organization for which the decision is being made.

In FIG. 2, the ML based underwriting system 210 includes processor 270, memory 260, network interface 280, and ML underwriting pipeline 220, as well as other components typically associated with computer processing systems.

The network interface 280 may be an interface that is coupled to a network (e.g., network 202) in order to receive information and transmit information. The memory 260 may include one or more different types of storage such as hard disk drive storage, nonvolatile memory, and volatile memory such as dynamic random access memory.

The processor 270 may be coupled to the network interface 280 and the memory 260. The processor 270 may be a microprocessor, a microcontroller, a digital signal processor, or a central processing unit. The term "processor" may refer to a device having two or more processing units or elements, e.g. a CPU with multiple processing cores. The processor 270 may be used to control the operations of the ML underwriting pipeline 220, including the form digitization engine 220 (including the ML digitization engine 222, key/value clarifier 224, third party system interface (I/F) 226, and digitization training manager 228) and the decision engine 220 (including the ML model 232, ML decision tracker and graph builder 234, decision output builder 236, train manager 242, and underwriter decision interface 238), by executing software instructions or code stored in the memory 260. For example, the processor 270 may execute instructions stored in the memory 260, which cause the processor 270 to control the operations of the ML underwriting pipeline 220 and perform key, value extraction operations, as well as the underwriting decision making operations, described in the embodiments of the present disclosure.

In one embodiment, training data including document images, key, value pairs, and associated decisions, which may be generated by an organization to use forms which are the subject of the training data, third party(s), or an organization that will deploy the ML based underwriting system, is received by ML underwriting system 210. The training data is stored in memory 260, and then accessed by digitization training manager 228 for training a first machine learning based process executed by ML digitization engine 222. In embodiments, the training data utilized by digitization training manager 228 includes document images and associated decisions for a form in a given context. Then, digitization training manager 228 performs a training process on ML digitization engine 222 as described in greater detail in U.S. patent application Ser. No. 16/167,334, filed on Oct. 22, 2018, titled "Systems and Methods for Machine Learning Based Content Extraction from Document Images," which is incorporated by reference herein in its entirety. In embodiments, ML digitization engine 222, once trained, comprises a sequence of trained ML models that analyze document images to correct for skew, perform text segmentation in document images, perform text recognition, and generate key, value pairs for a form. As discussed herein, the ML modes employed by the first machine learning based analysis process (e.g., digitization) is able to handle forms of varying quality, skew, language, orientation, etc.

Figure 6A:
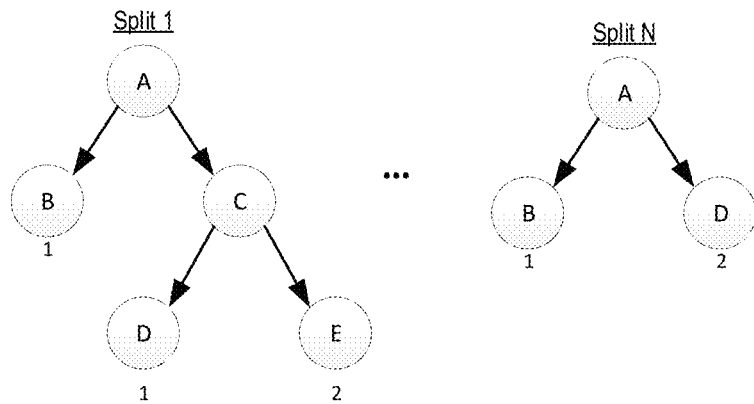
FIG. 6A illustrates an embodiment of splits in a tree based ML model.
Figure 6B:
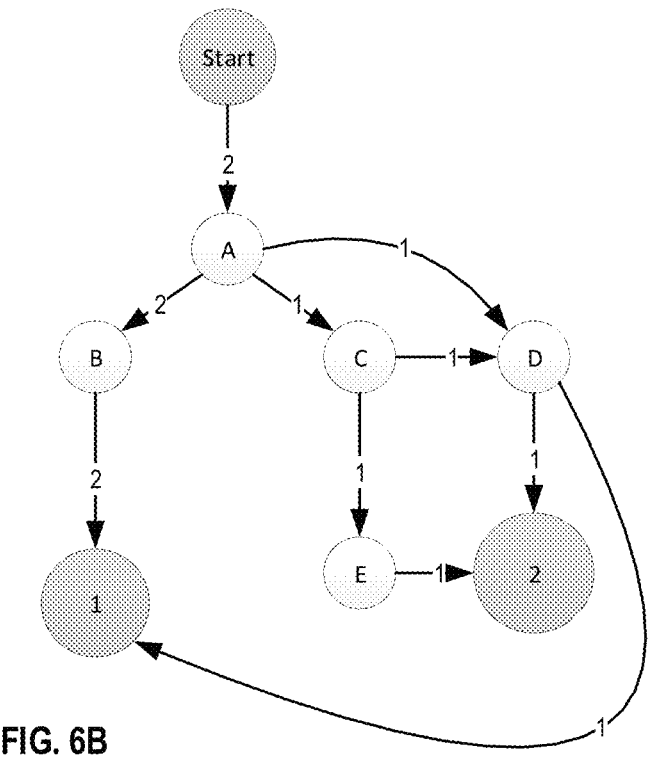
FIG. 6B illustrates an embodiment of a training explainability graph generated from the splits of a tree based ML model.

In embodiments, the key, value pairs generated by the ML digitization engine 222 after training, or those accompanying the received training data, and the associated decision, are utilized by training manager 242 to further train ML model 232. In one embodiment, ML model 232 is a tree-based machine learning model including nodes and edges that makes decisions at nodes, and splits along different edges, based on key, value pairs associated with respective nodes. That is, each node in the tree based model, makes a binary feature determination (e.g., a determination utilizing a value associated with a key, such as if age <50 branch right, else branch left) to make splits from the nodes down edges until an ultimate decision is reached (e.g., a leaf node associated with a decision). In embodiments, the tree based models are non-linear prediction models that employ random sampling of keys, decision conditions, and tree forms during training. Then, through repetitive and refined testing of variables using the random sampling techniques utilizing the training data, a set of splits provide sufficient confidence for making a decision based on an input of key, value pairs, such as exemplary simplified splits 1 through N illustrated in FIG. 6A. Furthermore, a single training explainability graph can be generated from the splits that flow through the tree based model into a single directed graph with weighted edges, as illustrated in FIG. 6B. In embodiments, the training explainability graph is a single graph generated prior to use in making an underwriting decision that provides an explanation of how decisions are reached given the splits 1 through N providing sufficient decision confidence. Furthermore, such a training explainability graph may be reviewed by a human underwriter to ensure compliance with corporate policy, governmental compliance, regulatory compliance, etc., by reviewing how splits are used to reach a decision in the tree based model. In embodiments, if an underwriter or other reviewer is not satisfied with the splits in the explainability graph, the graph may be re-generated with the same and/or different training data, further tuned with additional training data, manually edited, or a combination thereof.

In embodiments, training techniques for training a model, which is tree based includes training techniques for training decision trees utilizing, for example, CART, C4.5, C5, Random Forest, Gradient Boosted Trees, Adaptive Boosted Trees, XG Boosted Trees, Light GBM boosting, etc. may be used by training manager 242 to obtain a trained model to form the ML model 232.

In embodiments, after training, ML based underwriting system 210 may then receive document image 204 from a document capture system (e.g., document capture system 120) associated with a form for which a decision is to be rendered on behalf of an organization system (e.g. organization system 130). As discussed herein, the document image may be an image of a paper form or an image of an electronic form. Furthermore, the form may be associated with a context, which defines the domain of the form (e.g., medical insurance, mortgage application, etc., and optionally a specific organization which the form is associated with). Based on the context, either form digitization engine 220 may select a specific set of ML models for use by the ML digitization engine 220 to extract key, value pairs form the document image 204. In another embodiment, ML digitization image 220 itself may be one of a plurality of different digitization engines, each being associated with a different context, where an instance of a context-specific digitization engine 220 is used to handle a form with a matching context.

ML digitization engine 222 then performs a series of ML based analysis operations on the document image 204 to extract key, value pairs. In embodiments, for specific keys and/or values extracted by ML digitization engine 222 that do not satisfy a first confidence threshold, key/value clarifier 224 may generate a message, user interface, etc. which communicates the low confidence for the given key, value, or key, value pairing to a user (e.g., a user associated with the organization for which the decision is being made, or which is responsible for collecting images of application forms). In embodiments, the message and/or user interface enables a user to provide a response that updates, changes, and/or confirms the key, value, or key, value pairing. In embodiments, the updates, changes, and/or confirmations are stored in memory 260 along with the document image 204 as training data for future retraining of the ML digitization engine 222, as discussed herein. Furthermore, third party system interface 226 may obtain and/or extract additional values and/or confirm values for relevant key, value pairs for a form having the given context. For example, a health insurance form may indicate that an applicant is a non-smoker, but analysis of a third party micro-blogging system includes posts of the user stating that he smokes with images of him smoking. As another example, a user may leave blank an inquiry into a set of risky activities, but that user's social media posts show her hobby is flying small aircraft (e.g., one of the set of risky activities).

After digitization by ML digitization engine, and optional third party system key, value pair enhancement, decision engine 230 receives the finalized key, value, pairs extracted from the digitized document image. ML model 232 then applies the values from relevant keys to the model to reach a decision. The tree based model reaches an ultimate decision and optionally a confidence of the decision using the tree based model's evaluation of the specific extracted key, value pairs (e.g., which may be based on number of decisions, levels of the tree, what data was used in a decision, etc.).

Figure 8A:
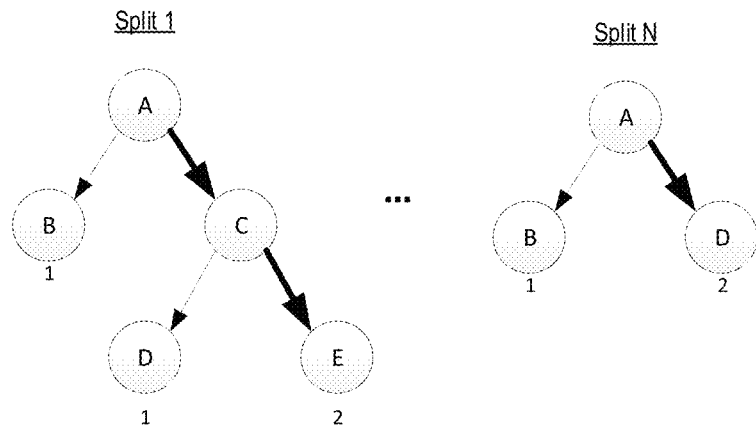
FIG. 8A illustrates an embodiment of a flow of splits in a tree based ML model for underwriting model decision insights by the machine learning based underwriting system.

In embodiments, and as illustrated in FIG. 8A, a simplified and exemplary traversal of each tree of ML decision tracker and graph builder 234 based on extracted key, value pairs is shown. In embodiments, ML decision tracker and graph builder 234 further monitors the tree traversal and records each specific split in the tree model (e.g., for each tree, track the sequence of nodes, value and decision at each node, and the resulting decision reached by the tree). For example, Split 1 in FIG. 8A could have a traversal record Split1:A→C→E→2, and Split N could have a traversal record SplitN:A→D→2, with traversal record for any number of other splits in the tree based model. In one embodiment, the tracking of records of each split, the sequence of decisions, and the keys, values used at each decision collectively form a verbose explanation of the ultimate decision of the tree based model. That is, an explicit record in the form of a decision explainability graph is generated from the set of tree traversal records using the training explainability graph that define, justify, and/or preserve how a specific decision on the form depicted in the document image 204 was made.

Figure 8B:
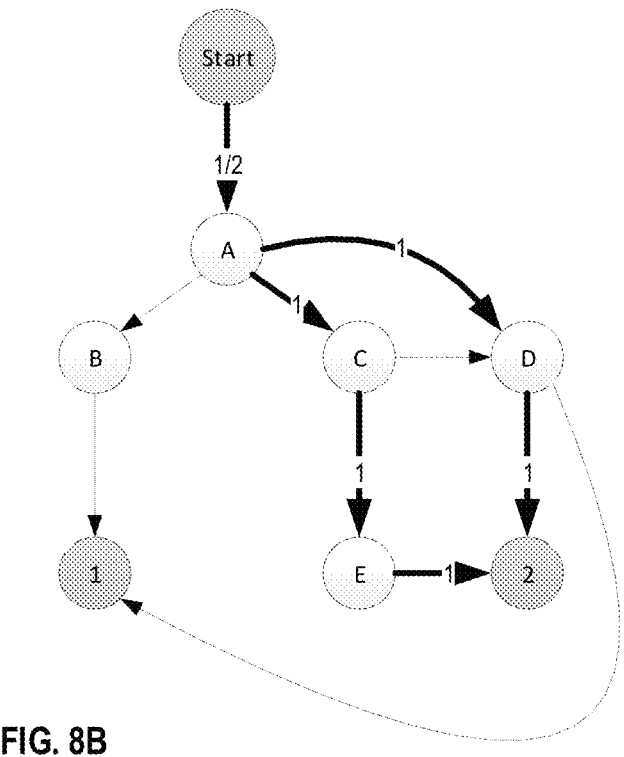
FIG. 8B illustrates an embodiment of a decision explainability graph mapping splits in a tree based ML model for enabling underwriting decision insights by the machine learning based underwriting system.

In embodiments, ML decision tracker and graph builder 234 utilizes the traversal of each tree, such as by using the traversal records, to build a decision explainability graph, as illustrated in FIG. 8B. The example embodiment of the decision explainability graph of FIG. 8B (e.g., a graph/model generated during application/form scoring) differs from the training explainability graph of FIG. 6B (e.g., generated during the model training processes discussed herein) in that the training explainability graph maps the decisions used in building a tree based model for decision making into the single directed and weighted graph. Then, the decision explainability graph is generated during the scoring of a new application/form and may be used by ML decision tracker and graph builder 234 to determine feature importance for all the decisions, as discussed herein. That is, a decision explainability graph tracks splits traversed by extracted application key, value pairs to explain a particular decision. In embodiments, feature importance is a measure of how important a key, value pair (e.g., a feature) was in making the ultimate decision on the form (e.g., an applicant's weight is more valuable in making a health insurance decision than an applicant's age). In one embodiment, feature importance is inferred based at least in part on a distance measure of the feature to the start of a decision's subgraph associated with a start node in the decision explainability graph. In one embodiment, the distance may be determined based on an inverse weight applied to each directed edge in the graph, and summing weights from the start to each node (e.g., A has a distance of 0.5, C has a distance of 1.5, D has a distance of 1.5, E has a distance of 2.5, etc.). From this, A is determined to be the most important feature in FIG. 8B, because the shortest distance to the start of the decision explainability graph or the highest weighted path enables an inference that it was the most influential feature (e.g., key, value pair) in reaching the ultimate decision associated with the form captured in the document image 204. In embodiments, a set of the most important features, as well as a feature importance score (e.g., derived from the distance, derived from a weight of an incoming edge, derived from weight or distance relative to other weights/distance, etc.) is determined ML decision tracker and graph builder 234. In embodiments, other feature importance scoring techniques may be used by analysis of the decision graph, trees based models, and/or record of tree traversals, such as node frequency, sum of edges weights, aggregated information gain, etc.

Decision output builder 236 may then generate a decision result, including the confidence of the decision, the verbose decision explanation, and feature relevance based on feature importance scoring, as discussed above. The decision graph builder 236 may then transmit the decision result with additional information, including the original document image 204 to an organization system 250, a document capture system 252, or a combination of systems. The decision includes the explainability data discussed herein (e.g., a decision with associated confidence, feature importance with feature importance scoring indicating the most relevant features to the decision, a verbose explanation, such as a decision explainability graph, indicating how a decision was reached for a given input, and the original document image or a link to the original document image).

In embodiments, as discussed above, for low confidence decisions that do not satisfy a second confidence threshold value, the decision, low confidence result, document image 238, and the explainability factors (e.g., verbose explanation, feature importance, a rendered decision explainability graph, etc.) are transmitted to an underwriter in a message, a graphical user interface, etc. associated with the organization system 250. The underwriter may review the received information and input a decision by responding to the message, inputting the revised decision in the graphical user interface, changing the decision confidence score, etc. The update, confirmation, and/or change are received by underwriter decision interface, which are then stored in memory 260 as retraining data for ML model 232.

Figure 3:
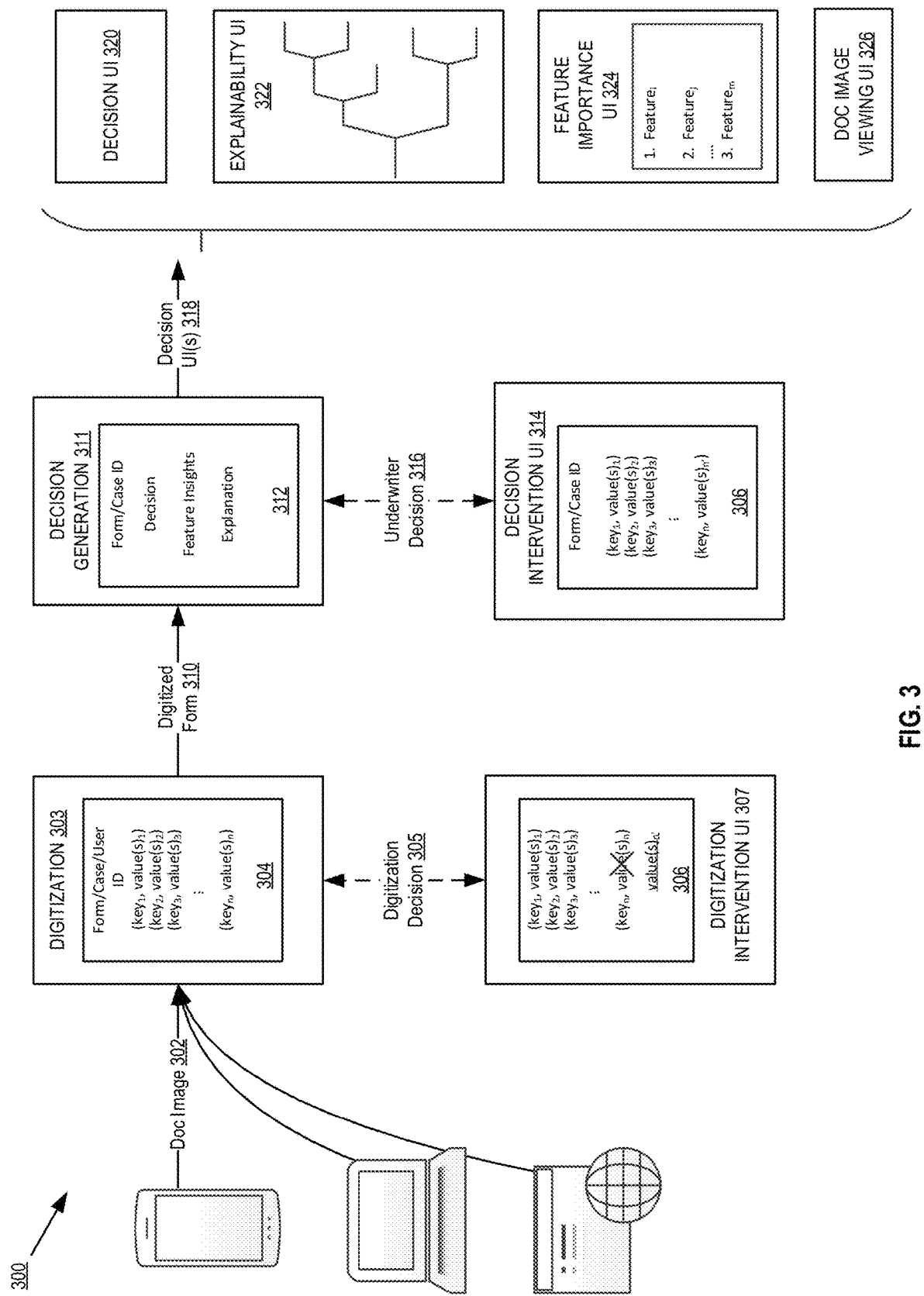
FIG. 3 is a diagram of one embodiment of stages in a method and system for automated underwriting based on document images performed by the machine learning based underwriting system.

FIG. 3 is a diagram of one embodiment 300 of stages in a method and system for automated underwriting based on document images performed by the machine learning based underwriting system. The stages may each be performed by processing logic that may comprise hardware (circuitry, dedicated logic, etc.), software (such as is run on a general purpose computer system or a dedicated machine), firmware, or a combination. Furthermore, the stages may be performed by a ML based underwriting system 110 or 210, which may in embodiments distribute the stages on different computer processing systems. In the embodiment illustrated in FIG. 3, it is assumed that the machine learning model(s) used by the digitization stage 303 and the decision generation stage 311 have been trained for the context to which the form captured by document image 302 belongs.

Initially, a document image capturing form data is received 302 from a document capture system. The document image, as discussed herein, is associated with a context (e.g., domain to which an organization belongs, and optionally a specific organization within the domain). In embodiments, the context may be identified by the document capture system which captured the document image, such as by an identifier associated with an organization that is deploying the document capture system and which is using the services provided by the ML based underwriting system.

The digitization stage 303 then performs a first machine learning based analysis of the document image to extract key, values pairs 304 for a form/case/user associated with the form captured by the document image. In one embodiment, an identifier received from the document capture system is used to identify the form and/or applicant associated with the form so that ML based underwriting system does not know an identity of a person whom a form is associated with. When a digitization decision fails to satisfy a first confidence threshold, a request for clarification 305 can be issued prior to entry into the second, decision generation stage 311. A digitization intervention user interface 307 is generated for a user associated with the completion of the form/application for an organization to correct, change, confirm, etc. the keys, values, and/or pairing of keys with values that fail to satisfy a threshold confidence.

Once the request for clarification is completed by the digitization stage 303, as necessary, a digitized form 310 is provided to the decision generation stage 311. The digitized form includes a plurality of key, value pairs, the original document image 302, any identifiers associated with the form, etc. In embodiments, the decision generation stage 311 performs a tree based machine learning model analysis of the key, value pairs to render a decision. In embodiments, when the decision does not satisfy a second threshold of confidence a decision intervention user interface 314 may be generated for an underwriter to provider a decision 316 based on the extracted key, value pairs that agrees with the decision generation stage's decision or alters the decision.

After the final decision 312 has been determined by the decision generation stage 311, explainability features may be generated and/or packaged with the decision, including a confidence measure associated with the decision, feature insights including feature importance ranking and/or scoring, and a verbose explanation of a decision.

The decision generation stage 311 then provides a message, data, and/or instructions for generation of one or more user interfaces enabling an organization to view a decision generated for a form/application in a decision user interface 320. The decision user interface may include a confidence associated with the decision, such as that generated from a tree based machine learning model analysis leading to the decision. An explainability user interface 322 that may include a graphical rendering of a decision explainability tree generated for a specific decision, or data providing explainability, may also be provided, which can include a rendering of the full, verbose explanation of a decision including decision splits through a tree based model, the collected decision explainabilty graph, etc. In embodiments, a feature importance user interface 324 may also be generated listing each feature, or a subset of features, based on their relative importance in reaching the decision presented in the decision user interface 320. For example, a subset of features, such as the top N features as determined using a decision graph, may be presented in user interface 324. Optional feature importance scoring, derived from the decision graph, relative importance, a ranking relative to other features, etc. may also be provided. Additionally, the original document image may be presented in a user interface 326.

In embodiments, each of user interfaces 320-326 may be presented in a single or multiple interfaces communicated to a representative of an organization system via a message (e.g., email message, file upload, etc.), a reference (e.g., a URL or other link to a web page user interface served by ML based underwriting system) to the user interface(s) may be provided in the message, or data and/or instructions used to configure an application are provided the message. The user interfaces enable full review of decisions generated by the stages of the ML underwriting system. Furthermore, the information associated with the decision may be retained by the organization for compliance, decision review, etc.

Figure 4:
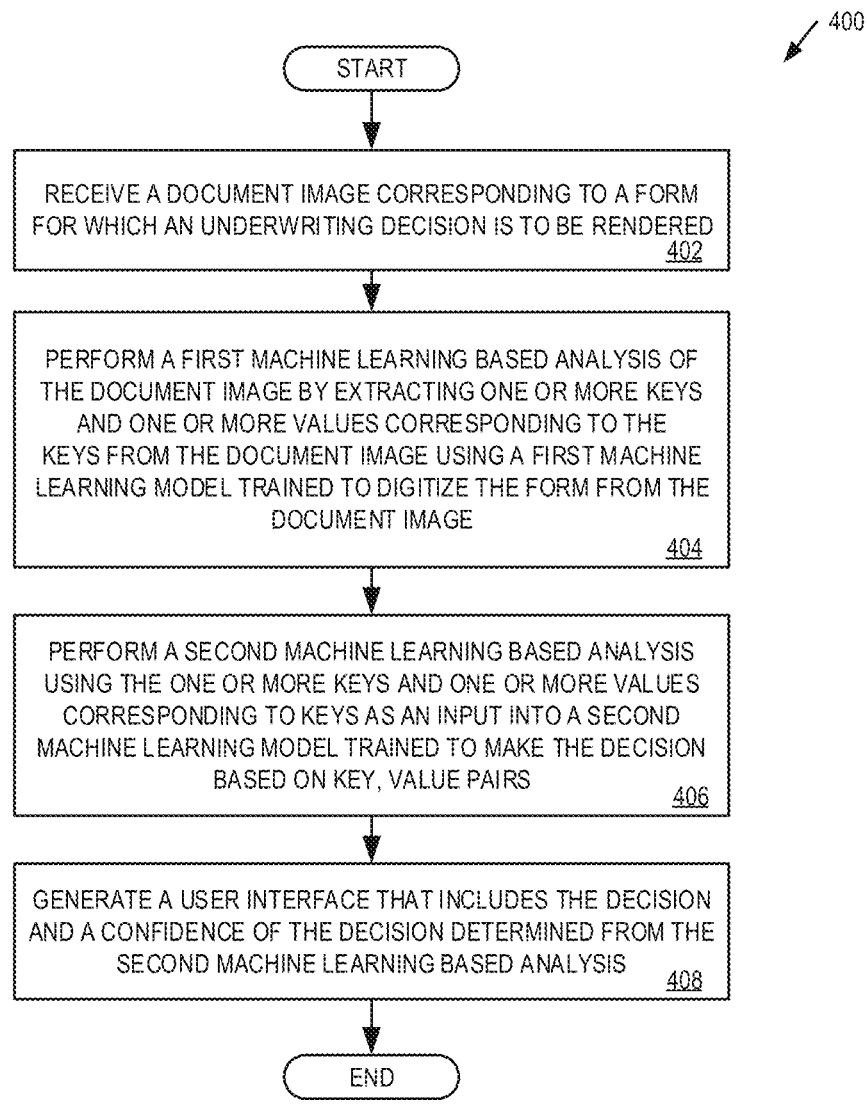
FIG. 4 is a flow diagram of one embodiment of a process for automated underwriting based on document images.

FIG. 4 is a flow diagram of one embodiment of a process 400 for automated underwriting based on document images. The method 400 is performed by processing logic that may comprise hardware (circuitry, dedicated logic, etc.), software (such as is run on a general purpose computer system or a dedicated machine), firmware, or a combination. In one embodiment, the method 400 is performed by a ML based underwriting system (e.g., system 110 or 210).

Referring to FIG. 4, processing logic begins by receiving a document image corresponding to a form for which an underwriting decision is to be rendered (processing block 402). As discussed herein, the form may be unstructured, in various languages, and associated with one of a plurality of different contexts. Furthermore, the document image can be in a variety of formats, such as GIF, TIFF, PDF, etc., and may be a single document image or multiple document images.

Processing logic then performs a first machine learning based analysis of the document image by extracting one or more keys and one or more values corresponding to the keys from the document image using a first machine learning model trained to digitize the form from the document image (processing block 404). As discussed herein, the first machine learning model may include a sequence of machine learning model analysis performed by server trained models that perform operations include ML based skew correction, ML based text segmentation, ML based text recognition, and ML based text extraction on the document image. In embodiments, each of the sequence of ML models used for performing the first machine leaning based analysis are trained prior to receipt of the document image, where the training is based on a plurality of document images for a given context and known key, value pairs, locations, etc. associated with the training documents.

Processing logic then performs a second machine learning based analysis using the one or more keys and one or more values corresponding to keys as an input into a second machine learning model trained to make the decision based on key, value pairs (processing block 406). As discussed herein, the second machine learning model is a non-linear descriptive tree based model. In embodiments, a tree based model is trained using techniques associated with training decision tree(s) based on CART, C4.5, C5, Random Forests, Gradient Boosted Trees, Adaptive Boosted Trees, XG Boosted Trees, Light GBM boosting, etc. ML models. In embodiments, the splits in tree based models are utilized to provide the descriptiveness associated with a decision reached by the second machine learning model. As discussed herein, by tracking the decisions in splits in a tree based model (e.g., such as using the splits modeled by the training explainability graph), as well as modeling the decision flows through each split in a single directed and weighted decision graph (e.g., a model generated in the form of a decision explainabilty graph), decision insights including relative feature importance, a verbose explanation that supports, justifies, and retains the reasoning behind a decision and explanation of key features and their connections to each other during model building and model-based analysis, and a confidence associated with the decision may be generated by processing logic. That is, in embodiments, the tracking of decisions using the splits and the generated decision explainabilty graph enable processing logic to determine a confidence measure of a decision (e.g., a percentage, a score, etc.), a list of top features as determined from the directed and weighted decision explainabilty graph, respective weight of the top features also determined from the directed and weighted decision explainabilty graph (e.g., how many times a feature is used in reaching a decision over N different splits in the tree based model), as well as other features relevant to the decision.

Processing logic generates a user interface that includes the decision and a confidence of the decision determined from the second machine learning based analysis (processing block 408). In embodiments, the user interface may include additional data, such as the verbose explanation providing full explainability of a decision reached by the second machine learning model, which in embodiments may include a modeling or visualization of the decision explainability graph generated for a specific decision. The user interface may also include feature level insights, including a listing, ranking and/or scoring of features (e.g., keys and associated values) that have been determined to be most influential in rendering the ultimate underwriting decision on the form depicted in the originally received document image, such as any combination of features and insights generated by processing logic in processing block 406.

Figure 5A:
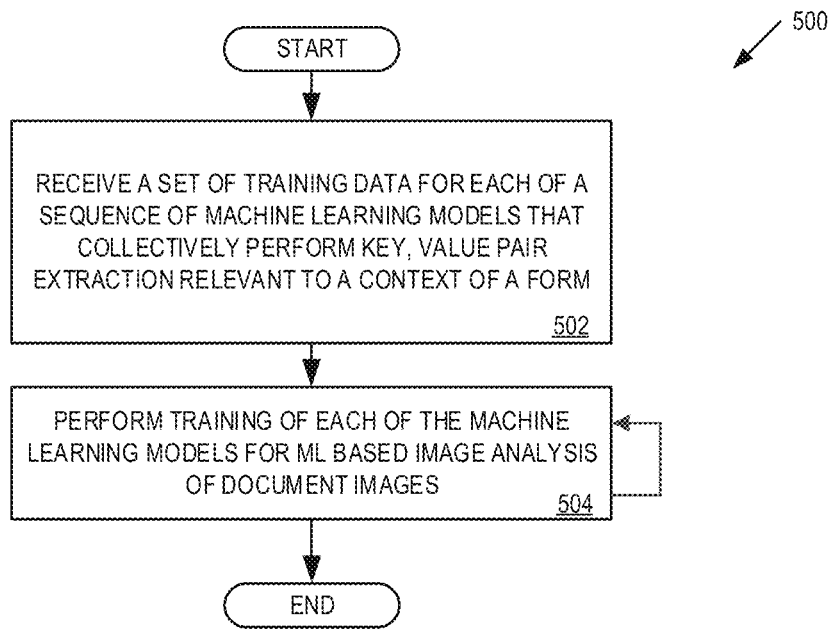
FIG. 5A is a flow diagram of one embodiment of a process for training a first machine learning model for performing document image digitization in the machine learning based underwriting system.

FIG. 5A is a flow diagram of one embodiment of a process 500 for training a first machine learning model for performing document image digitization in the machine learning based underwriting system. The method 500 is performed by processing logic that may comprise hardware (circuitry, dedicated logic, etc.), software (such as is run on a general purpose computer system or a dedicated machine), firmware, or a combination. In one embodiment, the method 500 is performed by a digitization training manager (e.g., digitization training manager 228) of a ML based underwriting system (e.g., system 110 or 210).

Processing logic begins by receiving a set of training data for each of a sequence of machine learning models that collectively perform key, value pair extraction relevant to a context of a form (processing block 502). The training data used to train the machine learning analysis techniques employed by the each in the sequence of machine learning models may be generated for the purpose of the operations being performed (e.g., skew correction, text segmentation, text recognition, key, value pair association, etc.), the type of form (e.g., context relevant to medical, insurance, mortgage, property and casualty, life, etc.), the language used in the form (e.g., English, Japanese, simplified Chinese, French, Spanish, etc.), likely implementations and/or formatting of such forms (e.g., GIF image capture, PDF image capture, etc.).

Processing logic then performs training on each of the machine learning models (processing block 504). In embodiments, the training utilizes techniques for training the model used at each stage. For example, if a support vector machine (SVM) is used in one stage, an SVM training technique is employed. After training, the series of machine learning models are trained to extract key, value pairs relevant to forms from the trained context. As such, different machine learning models may be trained for any number of different contexts. For example, the presently described embodiments of document image digitization do not need to use a document layout or structure description for a received document image, and instead apply the sequence of trained machine learning based image analysis processes to extract key, value pairs from the form. Because the form type is known (e.g., medical, dental, insurance, loan application, language type, region, etc.), and training may occur for any of a number of different contexts, different trained machine learning image analysis processes can be selected trained for usage based on the type of form and given context. For example, a medical form in the Japanese language may use training data to generate different trained machine learning image analyzers than training data used to generate machine learning models for extracting data from an insurance form in the English language for the region of California. Each machine learning image analysis process, as discussed herein, may be trained using training data generated for, and relevant for, forms of a specific type.

Figure 5B:
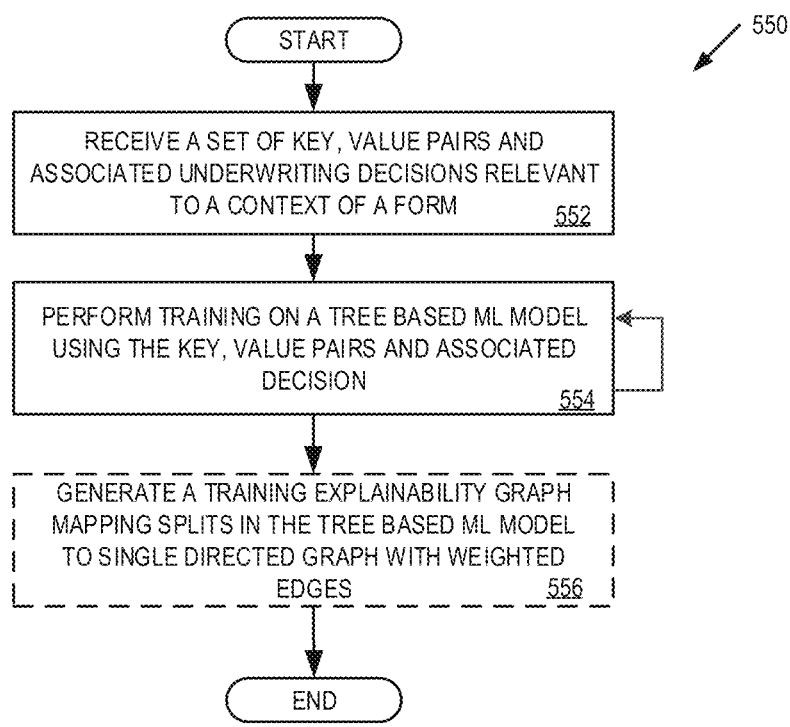
FIG. 5B is a flow diagram of one embodiment of a process for training a second machine learning model for underwriting decisions using a digitized document image generated by the first machine learning model in the machine learning based underwriting system.

FIG. 5B is a flow diagram of one embodiment of a process 550 for training a second machine learning model for underwriting decisions using a digitized document image generated by the first machine learning model in the machine learning based underwriting system. The method 550 is performed by processing logic that may comprise hardware (circuitry, dedicated logic, etc.), software (such as is run on a general purpose computer system or a dedicated machine), firmware, or a combination. In one embodiment, the method 500 is performed by a training manager (e.g., training manager 242) of a ML based underwriting system (e.g., system 110 or 210).

Processing logic begins by receiving a set of key, value pairs and associated underwriting decisions relevant to a context of a form (processing block 552). For example, a given context of a form may be based on domain of an organization for which underwriting decision are to be made, such as, for example, medical, insurance, property and casualty, and any other domain for which underwriting decision are to be made. Furthermore, the set of key, value pairs may be obtained from an organization, gathered by an ML based underwriting system, or a combination of sources. In embodiments, the decisions are those made by human underwriters when analyzing a form/application from which the key, value pairs were derived.

Processing logic then performs training on a tree based ML model using the key, value pairs and associated decision (processing block 554). In embodiments, the training includes random selection of keys, random distribution of keys in the trees, and random selection of conditions associated with keys to be analyzed. By repetitively analyzing each of the splits in a tree model during training, a model can be obtained that renders appropriate decisions above a minimum confidence level. In embodiments, tree based training techniques associated with decision trees utilize CART, C4.5, C5, Random Forests, Gradient Boosted Trees, Adaptive Boosted Trees, XG Boosted Trees, Light GBM boosting, etc., and are used by processing logic to obtain the a tree based model. For example, splits having decision nodes (e.g., nodes labeled as A, B, C, D, and E), and sequences of decision that transition between nodes based on results of key value analysis at each node are illustrated in FIG. 6A.

Processing logic then optionally generates a training explainability graph mapping the splits in the tree based ML model to a single directed graph with weighted edges (processing block 556). In embodiments, the training explainability graph is a mapping of nodes and edges from each split to a single directed graph, where the weight of an edge reflects a number of transitions between the two nodes in each of the splits in the tree based ML model, as illustrated in the example embodiment of the training explainability graph illustrated in FIG. 6B.

Figure 7:
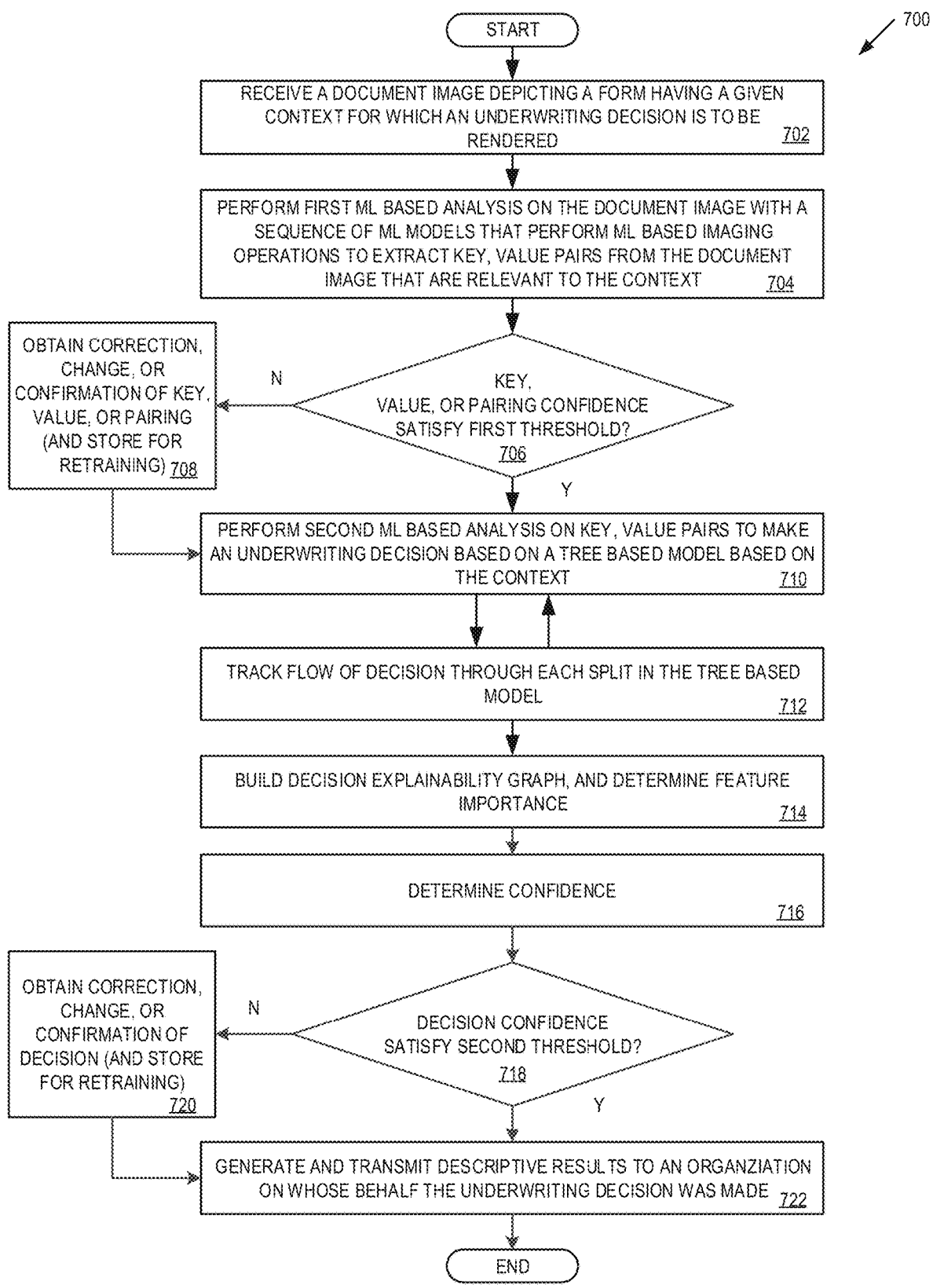
FIG. 7 is a flow diagram of one embodiment of a process for making underwriting decisions and underwriting decision insights by the machine learning based underwriting system.

FIG. 7 is a flow diagram of one embodiment of a process 700 for making underwriting decisions and underwriting decision insights by the machine learning based underwriting system. The method 700 is performed by processing logic that may comprise hardware (circuitry, dedicated logic, etc.), software (such as is run on a general purpose computer system or a dedicated machine), firmware, or a combination. In one embodiment, the method 700 is performed by a decision engine (e.g., decision engine 230) of a ML based underwriting system (e.g., system 110 or 210).

Processing logic begins by receiving a document image depicting a form having a given context for which an underwriting decision is to be rendered (processing block 702). In embodiments, the document image may be accompanied by an identifier associated with an applicant (e.g., a user who is filling out the form to apply for a service offered by an organization), an identifier associated with an organization (e.g., the organization that is seeking the underwriting decision regarding the user), or a combination of identifiers.

Processing logic performs a first ML based analysis on the document image with a sequence of ML models that perform ML based imaging operations to extract key, value pairs form the document image that are relevant to the context (processing block 704). As discussed herein, the sequence of ML models perform ML based image operations including, for example, ML based skew correction, then ML based text segmentation, then ML based text recognition, and finally assigning recognized text to key, value pairs. When a key, value, or key, value pairing fails to satisfy a first confidence threshold (e.g., when one or more of the sequence of ML models make a determination with low confidence) (processing block 706), processing logic may obtain a correction, change, or confirmation of the key, value, or pairing from a user associated with the organization (processing block 708). In embodiments, this correction, change, or confirmation may be stored as retraining data for periodically retraining the sequence of ML models.

After receiving the user input, or when all keys, values, and pairings are determined above the first threshold of confidence, processing logic performs a second machine learning based analysis on the key, value pairs extracted from the document image to make an underwriting decision based on a tree based model trained based on the context (processing block 710). The tree based techniques may include utilizing a collection of decision trees, random forests, XGBoost Trees, etc., and each model uses the entire set of key, value pairs to make a certain flow of decisions within the tree. In embodiments, the model may then make a conclusion as to what it believes the correct underwriting decision to be, including in embodiments a confidence level assigned to each decision generated from the model, as discussed herein.

In embodiments, while the tree based model is analyzing relevant key, value pairs, processing logic tracks flow of decisions through each split in the tree based model (processing block 712). This tracking may be used to build a decision explainability graph from the specific decisions made with splits in tree model with inputted key, value pairs, which processing logic further uses to determine feature importance of key, value pairs relative to the ultimate decision (processing block 714). For example, an example embodiment of a decision explainability graph built during the scoring of an application/form is illustrated in FIG. 8B. Furthermore, processing logic uses decision explainability graph, directed edges, weighting, etc. to generate a confidence of the decision (processing block 716). The decision confidence determination, decision splits tracking, training explainability graph building and model feature importance, and decision explainability graph building and feature importance determination are each discussed in greater detail herein.

When the decision has a confidence that fails to satisfy a second confidence threshold (processing block 718), processing logic may again seek user intervention to obtain a correction, change, or confirmation of the decision (processing block 720). In embodiments, the first and second confidence threshold may be predefined and/or set by the organization for which the underwriting decision is being made. Furthermore, as discussed above, the obtained change, update, or confirmation of the decision may be stored for later retraining of the tree based model employed by the ML model of the decision engine (e.g., decision engine 230).

Processing logic then generates and transmits descriptive results to an organization on whose behalf the underwriting decision is made (processing block 722). As discussed herein, the descriptive results provide full explainability of the decision, including which features are determined to be the most influential in reach the ultimate decision, the flow of decisions through each split in the tree based model (e.g., for compliance and audit purposes), the confidence associated with the decision (e.g., to provide for underwriter intervention on an occasional basis for difficult or unusual cases), a renderable decision explainability graph modeling the decision, etc.

Figure 9:
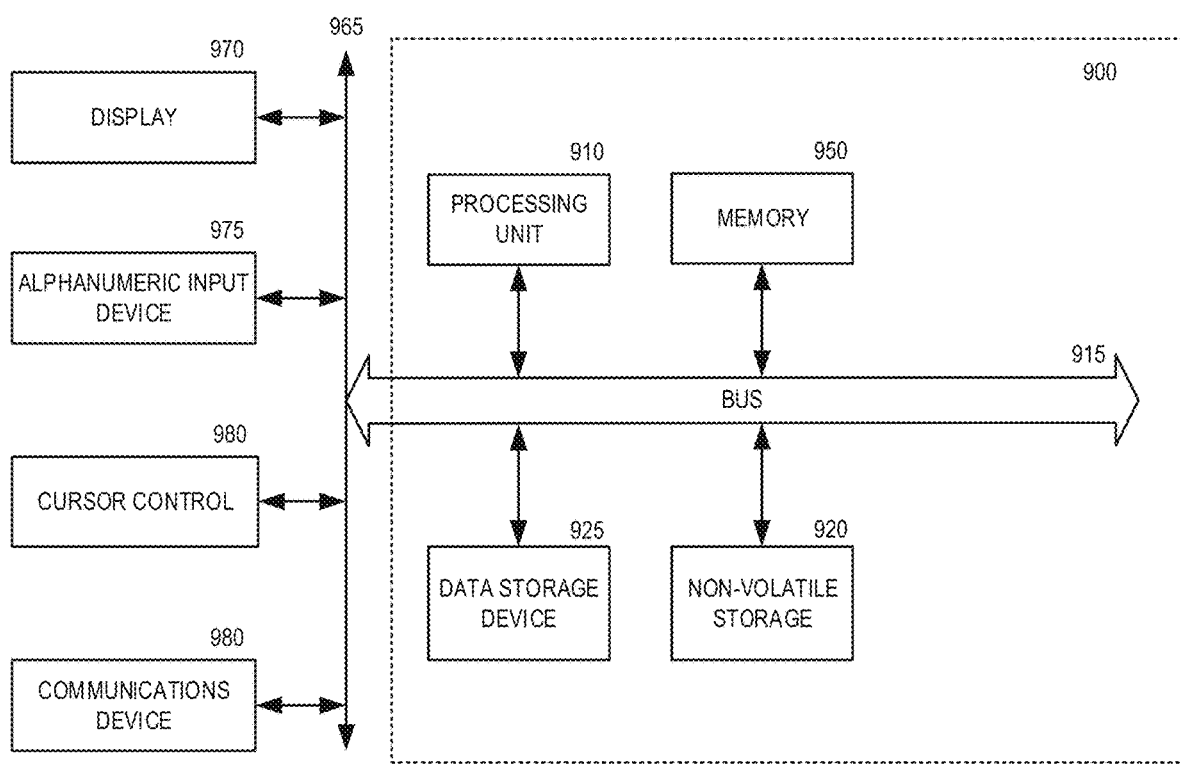
FIG. 9 is one embodiment of a computer system that may be used to support the systems and operations discussed herein

FIG. 9 is one embodiment of a computer system that may be used to support the systems and operations discussed herein. It will be apparent to those of ordinary skill in the art, however that other alternative systems of various system architectures may also be used.

The data processing system illustrated in FIG. 9 includes a bus or other internal communication means 915 for communicating information, and one or more processors (e.g., processor 910) coupled to the bus 615 for processing information. The system further comprises a random access memory (RAM) or other volatile storage device 950 (referred to as memory), coupled to bus 915 for storing information and instructions to be executed by processor 910. Main memory 950 also may be used for storing temporary variables or other intermediate information during execution of instructions by processor 910. The system also comprises a read only memory (ROM) and/or static storage device 920 coupled to bus 915 for storing static information and instructions for processor 910, and a data storage device 925 such as a magnetic, optical, solid storage, or other data storage device. Data storage device 925 is coupled to bus 915 for storing information and instructions.

The system may further be coupled to a display device 970, such as for example a light emitting diode (LED) display or a liquid crystal display (LCD) coupled to bus 915 through bus 965 for displaying information to a computer user. An alphanumeric input device 975, including alphanumeric and other keys, touch screens, etc., may also be coupled to bus 915 through bus 965 for communicating information and command selections to processor 910. An additional user input device is cursor control device 980, such as a touchpad, mouse, a trackball, stylus, or cursor direction keys coupled to bus 915 through bus 965 for communicating direction information and command selections to processor 910, and for controlling cursor movement on display device 970.

Another device, which may optionally be coupled to computer system 900, is a communication device 990 for accessing other nodes of a distributed system via a network. The communication device 990 may include any of a number of commercially available networking peripheral devices such as those used for coupling to an Ethernet, token ring, Internet, or wide area network. The communication device 990 may further be a null-modem connection, or any other mechanism that provides connectivity between the computer system 900 and the outside world. Note that any or all of the components of this system illustrated in FIG. 9 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 950, mass storage device 925, or other storage medium locally or remotely accessible to processor 910.

It will be apparent to those of ordinary skill in the art that the system, method, and process described herein can be implemented as software stored in main memory 950 or read only memory 920 and executed by processor 910. This control logic or software may also be resident on an article of manufacture comprising a computer readable medium having computer readable program code embodied therein and being readable by the mass storage device 925 and for causing the processor 910 to operate in accordance with the methods and teachings herein.

The embodiments discussed herein may also be embodied in a handheld or portable device containing a subset of the computer hardware components described above. For example, the handheld device may be configured to contain only the bus 915, the processor 910, and memory 950 and/or 925. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 910, a data storage device 925, a bus 915, and memory 950, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

We claim:

1. A computer implemented method for generating a decision based on document images, the method comprising:
   receiving, by a computer processing system, a document image corresponding to a form and data depicted within the document image of the form for which the decision is to be rendered from the data;
   performing, by the computer processing system, a first machine learning based analysis of the document image by transforming the document image, using a first machine learning model trained to digitize the form from the document image, the first machine learning model digitizing the document image and extracting one or more keys and one or more values corresponding to the keys from a digitized version of the document image, wherein a sequential pipeline of at least two or more trained machine learning based image analysis processes perform the digitizing of the document image and the extracting the one or more keys and one or more values to transform the document image;
   performing, by the computer processing system, a second machine learning based analysis using the one or more keys and one or more values corresponding to keys as an input into a second machine learning model that generates the decision based on key, value pairs, the second machine learning model, the second machine learning model comprises a tree based model trained to generate the decision based on key, value pairs, and generating the decision using the tree based model further comprises:
      generating the decision based on an analysis of the key, value pairs by the tree based model, wherein the tree based model comprises a plurality of splits, and the generation of the decision further comprises: tracking splits made in the tree based model based on an evaluation of the key, value pairs at each split in the plurality of splits, and tracking a flow of decisions and the associated key, value pair used in each of the decisions through the tree based model,
      generating an explanation of how the second machine learning model generated the decision, the explanation comprising: (i) a decision explainability graph, (ii) a confidence of the decision based on the tree based model, (iii) feature importance of two or more keys used by the tree based model in arriving at the decision, and (iv) a verbose explanation of the decision, and generating the explanation comprises:
         modeling the flow of decisions made within the tree based decision model as a directed graph, wherein a collection of decisions comprised in the directed graph provides the verbose explanation as individual decisions that contributed to the decision,
         mapping the tracked flow of individual decision performed by the tree based model including tracking splits in the tree based model based on associated key, value pair evaluated at each split,
         generating the decision explainability graph from the mapping, the decision explainability graph comprising a directed graph with nodes, edges, and a weight assigned to each edge, wherein the decision explainability graph comprises a start node of the directed graph representing a transition to an initial split, at least one decision node representing an intermediate decision within the directed graph, and a plurality of end nodes of the directed graph representing the decision, and wherein each edge joins two nodes and comprises a weighted direction corresponding to a number of tracked transitions in the tree based decision model between the two nodes in a given direction when making the decisions, and
         generating, from the decision explainability graph, the feature importance for the two or more keys used by the tree based decision model in arriving at the decision, wherein the feature importance comprises an inferred relative importance a key, value pair from the plurality of key, value pairs in influencing the decision, wherein each key and associated value from the key, value pairs is assigned a feature importance value based the generated decision graph;
   transmitting, by the computer processing system to an organization system, a user interface generated using the decision, the confidence of the decision determined from the second machine learning based analysis, and the explanation of how the second machine learning model generated the decision, further comprising:
      detecting when the confidence of the decision generated by the second machine learning model fails to satisfy a decision confidence threshold,
      rendering, in the user interface, (i) data indicating a failure to satisfy the decision confidence threshold and one or more of the keys, (ii) associated values extracted from the document image and the document image, (iii) explainability data comprising the explainability graph, the verbose explanation, and two or more keys and their corresponding importance values, the explainability data indicative of the explanation of how the second machine learning model generated the decision, and (iv) the confidence of the decision determined from the second machine learning based analysis,
      receiving a user decision from the organization system that changes one or more of the keys extracted from the document image, associated values extracted from the document image, key-value pairs, and a revised confidence value of the decision,
      storing the user decision along with the one or more of the keys and associated values extracted from the document image, the revised confidence value, and the document image in a collection of training data for retraining the second machine learning model, and
      periodically performing retraining of the second machine learning model based at least in part on the collection of training data comprising a plurality of user decisions to generate a retrained second machine learning model; and executing, by the computer processing system, the first machine learning model for extracting one or more second keys and one or more second values corresponding to keys from a digitized version of a second document image, and executing the retrained second machine learning model to generate a second decision using the extracted one or more second keys and associated one or more second values.

2. The method of claim 1, wherein performing the first machine learning based analysis of the document image further comprises:
   transforming the document image to a set of one or more key, value pairs;
   providing the key, value pairs as the input to the second machine learning model; and
   generating the decision by analysis of the key, value pairs by the second machine learning model.

3. The method of claim 1, wherein the feature importance value assigned to a key, value pair is based, at least in part, on a relative weighted distance of the node in which the key, value pair is contained to the start node in the decision explainability graph.

4. The method of claim 1, wherein the second machine learning model is a tree based model, further comprising:
   receiving a set of training data comprising a plurality of sets of key, value pairs and a plurality of corresponding decisions to be reached by the tree based model using associated key, value pairs from the sets of key, value pairs;
   performing a machine learning training process by iteratively using each of the plurality of sets of key, value pairs and associated decisions to train the second machine learning model based on keys as decision nodes in the tree based model; and
   using the trained second machine learning model when performing the second machine learning based analysis.

5. The method of claim 1, further comprising:
   generating, by the first machine learning model, a confidence value associated with each key, value pair extracted from the document image, wherein the confidence value is a statistical value generated by the first machine learning model indicative of a confidence that a correct key, a correct value, or a key, value pairing has been correctly extracted from the document image;
   detecting when the digitization of the form by the first machine learning model is associated with one or more confidence values that fail to satisfy a first threshold;
   generating a user interface indicating a failure to satisfy the first threshold and at least one key, value, or key, value pair associated with the failure to satisfy the first threshold; and
   receiving user input via the user interface supplying one or more corrected keys, values, or key, value pairs; and
   substituting the received corrected keys, values, or key, value pairs prior to analysis by the second machine learning model.

6. The method of claim 1, wherein the document image is received from a document capture system, wherein the document capture system is one of a mobile device, a personal computer, a or multifunction peripheral device, and wherein the document image is one of an image of a paper form captured by a camera of the document capture system, an image of the paper form generated by a scanner coupled with the document capture system, an image file generated by a user interface in which a user enters data into a form at the document captured system.

7. The method of claim 1, wherein generating the user interface further comprises:
   generating an electronic message comprising the user interface; and
   transmitting the electronic message to an organization system for which the decision was made.

8. The method of claim 1, wherein the decision is one of a healthcare underwriting decision, a mortgage underwriting decision, or an insurance underwriting decision.

9. The method of claim 8, wherein the one or more keys and one or more values corresponding to the keys extracted from the document image are relative to a domain of the decision.

10. The computer implemented method of claim 1, wherein the computer processing system is a distributed computer processing system, a first server of the distributed computer processing system performs the first machine learning based analysis of the document image, a second server of the distributed the distributed computer processing system performs the second machine learning based analysis using the one or more keys and one or more values corresponding to keys transmitted from the first server to the second server as the input into the second machine learning model, and wherein, and
   the first server executes an instance of the first machine learning model and the second server executes an instance of the second machine learning model, and wherein the instance of the first machine learning model and the instance of the second machine learning models are distributed to different servers of the distributed computer processing system to: (i) balance computing load among servers of the distributed computer processing system, (ii) reduce communication bandwidth consumption caused by communications exchanged between servers of the distributed computer processing system, or (iii) a combination thereof.

11. The method of claim 1, further comprising:
   accessing, by the computer processing system via network, a third party system that stores data;
   searching, by the computer processing system, supplemental data relevant to the extracted one or more keys at the third party system by performing a keyword-based search using a selected key from the extracted one or more keys;
   extracting, by the computer processing system, a supplemental value relevant to the selected key from the supplemental data to form a supplemental key, value pair; and
   replacing, by the computer processing system prior to performing the second machine learning based analysis, a value of a key, value pair obtained from the performance of the first machine learning model based analysis with the supplemental value when the supplemental value differs from the value of the key, value pair.

12. A non-transitory computer readable storage medium including instructions that, when executed by a computer processing system, cause the computer processing system to perform operations for generating a decision based on document images, the operations comprising:
   receiving a document image corresponding to a form and data depicted within the document image of the form for which the decision is to be rendered from the data;
   performing a first machine learning based analysis of the document image by transforming the document image, using a first machine learning model trained to digitize the form from the document image, the first machine learning model digitizing the document image and extracting one or more keys and one or more values corresponding to the keys from a digitized version of the document image, wherein a sequential pipeline of at least two or more trained machine learning based image analysis processes perform the digitizing of the document image and the extracting the one or more keys and one or more values to transform the document image;

performing a second machine learning based analysis using the one or more keys and one or more values corresponding to keys as an input into a second machine learning model that generates the decision based on key, value pairs, the second machine learning model, the second machine learning model comprises a tree based model trained to generate the decision based on key, value pairs, and generating the decision using the tree based model further comprises:

generating the decision based on an analysis of the key, value pairs by the tree based model, wherein the tree based model comprises a plurality of splits, and the generation of the decision further comprises; tracking splits made in the tree based model based on an evaluation of the key, value pairs at each split in the plurality of splits, and tracking a flow of decisions and the associated key, value pair used in each of the decisions through the tree based model, generating an explanation of how the second machine learning model generated the decision, the explanation comprising: (i) a decision explainability graph, (ii) a confidence of the decision based on the tree based model, (iii) feature importance of two or more keys used by the tree based model in arriving at the decision, and (iv) a verbose explanation of the decision, and generating the explanation comprises:

modeling the flow of decisions made within the tree based decision model as a directed graph, wherein a collection of decisions comprised in the directed graph provides the verbose explanation as individual decisions that contributed to the decision, mapping the tracked flow of individual decisions performed by the tree based model including tracking splits in the tree based model based on associated key, value pair evaluated at each split, generating the decision explainability graph from the mapping, the decision explainability graph comprising a directed graph with nodes, edges, and a weight assigned to each edge, wherein the decision explainability graph comprises a start node of the directed graph representing a transition to an initial split, at least one decision node representing an intermediate decision within the directed graph, and a plurality of end nodes of the directed graph representing the decision, and wherein each edge joins two nodes and comprises a weighted direction corresponding to a number of tracked transitions in the tree based decision model between the two nodes in a given direction when making the decisions, and generating, from the decision explainability graph, the feature importance for the two or more keys used by the tree based decision model in arriving at the decision, wherein the feature importance comprises an inferred relative importance a key, value pair from the plurality of key, value pairs in influencing the decision, wherein each key and associated value from the key, value pairs is assigned a feature importance value based the generated decision graph, transmitting, to an organization system, a user interface generated using the decision, the confidence of the decision determined from the second machine learning based analysis, and the explanation of how the second machine learning model generated the decision, further comprising:

detecting when the confidence of the decision generated by the second machine learning model fails to satisfy a decision confidence threshold, rendering, in the user interface, (i) data indicating a failure to satisfy the decision confidence threshold and one or more of the keys (ii) associated values extracted from the document image and the document image (iii) explainability data comprising the explainability graph, the verbose explanation, and two or more keys and their corresponding importance values, the explainability data indicative of the explanation of how the second machine learning model generated the decision, and (iv) the confidence of the decision determined from the second machine learning based analysis, receiving a user decision from the organization system that changes one or more of the keys extracted from the document image, associated values extracted from the document image, key-value pairs, and a revised confidence value of the decision, storing the user decision along with the one or more of the keys and associated values extracted from the document image, the revised confidence value, and the document image in a collection of training data for retraining the second machine learning model, and periodically performing retraining of the second machine learning model based at least in part on the collection of training data comprising a plurality of user decisions to generated a retrained second machine learning model; and executing the first machine learning model for extracting one or more second keys and one or more second values corresponding to keys from a digitized version of a second document image, and executing the retrained second machine learning model to generate a second decision using the extracted one or more second keys and associated one or more second values.

13. The non-transitory computer readable storage medium of claim 12, wherein performing the first machine learning based analysis of the document image further comprises:

transforming the document image to a set of one or more key, value pairs;

providing the key, value pairs as the input to the second machine learning model; and generating the decision by analysis of the key, value pairs by the second machine learning model.

14. The non-transitory computer readable storage medium of claim 12, wherein the feature importance value assigned to a key, value pair is based, at least in part, on a relative weighted distance of the node in which the key, value pair is contained to the start node in the decision explainability graph.

15. The non-transitory computer readable storage medium of claim 12, wherein the second machine learning model is a tree based model, further comprising:

receiving a set of training data comprising a plurality of sets of key, value pairs and a plurality of corresponding decisions to be reached by the tree based model using associated key, value pairs from the sets of key, value pairs;

performing a machine learning training process by iteratively using each of the plurality of sets of key, value pairs and associated decisions to train the second machine learning model based on keys as decision nodes in the tree based model; and using the trained second machine learning model when performing the second machine learning based analysis.

16. The non-transitory computer readable storage medium of claim 12, further comprising:

generating, by the first machine learning model, a confidence value associated with each key, value pair extracted from the document image, wherein the confidence value is a statistical value generated by the first machine learning model indicative of a confidence that a correct key, a correct value, or a key, value pairing has been correctly extracted from the document image;

detecting when the digitization of the form by the first machine learning model is associated with one or more confidence values that fail to satisfy a first threshold;

generating a user interface indicating a failure to satisfy the first threshold and at least one key, value, or key, value pair associated with the failure to satisfy the first threshold; and receiving user input via the user interface supplying one or more corrected keys, values, or key, value pairs; and substituting the received corrected keys, values, or key, value pairs prior to analysis by the second machine learning model.

17. The non-transitory computer readable storage medium of claim 12, wherein the document image is received from a document capture system, wherein the document capture system is one of a mobile device, a personal computer, a or multifunction peripheral device, and wherein the document image is one of an image of a paper form captured by a camera of the document capture system, an image of the paper form generated by a scanner coupled with the document capture system, an image file generated by a user interface in which a user enters data into a form at the document captured system.

18. The non-transitory computer readable storage medium of claim 12, wherein generating the user interface further comprises:

generating an electronic message comprising the user interface; and transmitting the electronic message to an organization system for which the decision was made.

19. The non-transitory computer readable storage medium of claim 12, wherein the decision is one of a healthcare underwriting decision, a mortgage underwriting decision, or an insurance underwriting decision.

20. The non-transitory computer readable storage medium of claim 19, wherein the one or more keys and one or more values corresponding to the keys extracted from the document image are relative to a domain of the decision.

21. A system, comprising:

a network interface configured to receive a document image corresponding to a form and data depicted within the document image of the form for which decision is to be rendered from the data;

a memory that stores the document image; and a processor coupled with the memory configured to access the document image and further configured to:

perform a first machine learning based analysis of the document image by transforming the document image, using a first machine learning model trained to digitize the form from the document image, the first machine learning model digitizing the document image and extracting one or more keys and one or more values corresponding to the keys from a digitized version of the document image, wherein a sequential pipeline of at least two or more trained machine learning based image analysis processes perform the digitizing of the document image and the extracting the one or more keys and one or more values to transform the document image, perform a second machine learning based analysis using the one or more keys and one or more values corresponding to keys as an input into a second machine learning model that generates the decision based on key, value pairs, the second machine learning model, the second machine learning model comprises a tree based model trained to generate the decision based on key, value pairs, and the processor configured to generate the decision using the tree based model further comprises the processor configured to:

generate the decision based on an analysis of the key, value pairs by the tree based model, wherein the tree based model comprises a plurality of splits, and the generation of the decision further comprises: tracking splits made in the tree based model based on an evaluation of the key, value pairs at each split in the plurality of splits, and tracking a flow of decisions and the associated key, value pair used in each of the decisions through the tree based model, generate an explanation of how the second machine learning model generated the decision, the explanation comprising: (i) a decision explainability graph, (ii) a confidence of the decision based on the tree based model, (iii) feature importance of two or more keys used by the tree based model in arriving at the decision, and (iv) a verbose explanation of the decision, and generation the explanation comprises the processor configured to:

model the flow of decisions made within the tree based decision model as a directed graph, wherein a collection of decisions comprised in the directed graph provides the verbose explanation as individual decisions that contributed to the decision, map the tracked flow of individual decision performed by the tree based model including tracking splits in the tree based model based on associated key, value pair evaluated at each split, generate the decision explainability graph from the mapping, the decision explainability graph comprising a directed graph with nodes, edges, and a weight assigned to each edge, wherein the decision explainability graph comprises a start node of the directed graph representing a transition to an initial split, at least one decision node representing an intermediate decision within the directed graph, and a plurality of end nodes of the directed graph representing the decision, and wherein each edge joins two nodes and comprises a weighted direction corresponding to a number of tracked transitions in the tree based decision model between the two nodes in a given direction when making the decisions, and generate, from the decision explainability graph, the feature importance for the two or more keys used by the tree based decision model in arriving at the decision, wherein the feature importance comprises an inferred related importance a key, value pair from the plurality of key, value pairs in influencing the decision, wherein each key and associated value from the key, value pairs is assigned a feature importance value based on the generated decision graph, transmit, to an organization system, a user interface generated using the decision, the confidence of the decision determined from the second machine learning based analysis, and the explanation of how the second machine learning model generated the decision, and wherein the processor is further configured to:

detect when the confidence of the decision generated by the second machine learning model fails to satisfy a decision confidence threshold, render, in the user interface, (i) data indicating a failure to satisfy the decision confidence threshold and one or more of the keys, (ii) associated values extracted from the document image and the document image, (iii) explainability data comprising the explainability graph, the verbose explanation, and two or more keys and their corresponding importance values, the explainability data indicative of the explanation of how the second machine learning model generated the decision, and (iv) the confidence of the decision determined from the second machine learning based analysis, receive a user decision from the organization system that changes one or more of the keys extracted from the document image, associated values extracted from the document image, key-value pairs, and a revised confidence value of the decision, store the user decision along with the one or more of the keys and associated values extracted from the document image, the revised confidence value, and the document image in a collection of training data for retraining the second machine learning model, and periodically perform retraining of the second machine learning model based at least in part on the collection of training data comprising a plurality of user decisions to generate a retrained second machine learning model, and execute the first machine learning model for extracting one or more second keys and one or more second values corresponding to keys from a digitized version of a second document image, and executing the retrained second machine learning model to generate a second decision using the extracted one or more second keys and associated one or more second values.

* * * * *